United States Patent [19]

Boden et al.

[11] Patent Number: 5,300,623
[45] Date of Patent: Apr. 5, 1994

[54] METHOD FOR MAKING POLYCARBONATE SUBSTANTIALLY FREE OF DIARYL CARBONATE

[75] Inventors: Eugene P. Boden, Scotia; Peter D. Phelps, Schenectady, both of N.Y.

[73] Assignee: General Electric Company, Schenectady, N.Y.

[21] Appl. No.: 66,380

[22] Filed: May 24, 1993

[51] Int. Cl.$^5$ ............................................. C08G 64/24
[52] U.S. Cl. ...................................... 528/199; 528/125; 528/126; 528/171; 528/174; 528/196; 528/198; 528/202
[58] Field of Search ............... 528/199, 198, 196, 202, 528/125, 126, 171, 174

[56] References Cited

U.S. PATENT DOCUMENTS

| | | | |
|---|---|---|---|
| 4,737,573 | 4/1988 | Silva et al. | 528/199 |
| 4,743,676 | 5/1988 | Silva et al. | 528/371 |
| 4,939,230 | 7/1990 | Munjal et al. | 528/199 |
| 5,043,203 | 8/1991 | Fyvie et al. | 528/198 |

*Primary Examiner*—Harold D. Anderson
*Attorney, Agent, or Firm*—William A. Teoli; William H. Pittman

[57] ABSTRACT

A method is provided for making polycarbonate by phosgenating a mixture of bisphenol and phenolic chain-stopper under interfacial reaction conditions in the presence of a phase transfer catalyst. A polycarbonate is obtained which is substantially free of diarylcarbonate.

6 Claims, No Drawings

METHOD FOR MAKING POLYCARBONATE SUBSTANTIALLY FREE OF DIARYL CARBONATE

CROSS REFERENCE TO RELATED APPLICATION

Reference is made to copending application Ser. No. 08/066,382, filed May 24, 1993 and Ser. No. 08/066,381, filed May 24, 1993 filed concurrently herewith.

BACKGROUND OF THE INVENTION

The present invention relates to a method for making phenolic chain-stopped polycarbonate which is substantially free of diarylcarbonate. More particularly, the present invention relates to the employment of a phase transfer catalyst during the phosgenation of bisphenol to produce chloroformate terminated polycarbonate, followed by the addition of an amount of phenolic chain-stopper substantially equivalent to the chloroformate terminal groups.

Experience has shown that during the preparation of polycarbonates by the phosgenation of bisphenols under interfacial reaction conditions utilizing aromatic hydroxy chain-stoppers, such as phenol, diarylcarbonate is often formed as a by-product. Because diarylcarbonate can plate out during injection molding procedures, it represents an undesirable contaminant in certain polycarbonate applications, such as CD grade polycarbonate.

As shown by U.S. Pat. Nos. 4,737,573, 4,743,676 and 5,043,203, various techniques have been used to minimize the formation of diaryl carbonates during phosgenating procedures for making end-capped polycarbonates. In one procedure, a bischloroformate oligomer is prepared utilizing an excess of 1.1–3.0 moles of phosgene, per mole of bisphenol. A phenolic chain-stopper, such as phenol, and a condensation catalyst can be added to the mixture. In another procedure, a phenolic chain-stopper is added to a bischloroformate oligomer to produce a partially capped bischloroformate, followed by the addition of an interfacial polycarbonate condensation catalyst. A further procedure for making aromatic polycarbonate substantially free of diarylcarbonate is by forming an oligomeric bisphenol monochloroformate, and then incorporating an end-capping phenol, tertiary organic amine and additional alkali metal hydroxide into the mixture.

Although several prior art procedures have been found effective for minimizing diarylcarbonate formation, experience has shown that an excessive amount of phosgene or chloroformate end groups are necessarily consumed before polycarbonate molecular weight build-up can be achieved. It would be desirable therefore to provide a method for making polycarbonates substantially free of diarylcarbonate without excessive consumption of phosgene, chloroformate end groups or both.

SUMMARY OF THE INVENTION

The present invention is based on the discovery that polycarbonate substantially free of diarylcarbonate can be made by substituting a phase transfer catalyst, RIPTCTI, for a tertiary organic amine catalyst combined with a unique phosgenation procedure. A bisphenol is initially phosgenated under interfacial reaction conditions until about 70 mole % of phosgene is introduced based on total moles of bisphenol added and a calculated level of phenolic chain-stopper required for a particular polycarbonate MW. The pH of the resulting mixture is then lowered to a predetermined value, and the phosgenation is continued while the pH of the mixture is maintained at the predetermined value until up to about a 2 mole % excess of phosgene has been added based on total moles of available phenolic hydroxy groups calculated by adding moles of bisphenol charged to the reactor and anticipated phenolic chain-stopper in view of the molecular weight of polycarbonate desired. There is then introduced into the resulting mixture, the calculated amount of phenolic chain-stopper, and the pH of the mixture is then raised to a final predetermined value.

It has been found that by following the above procedure, substantially diarylcarbonate-free polycarbonate can be made, and a substantial reduction in excess phosgene usage can be realized. Excess chloroformate end groups can be eliminated if necessary, as shown hereinafter.

STATEMENT OF THE INVENTION

There is provided by the present invention, a method for making polycarbonate having a predetermined molecular weight which is substantially free of diarylcarbonate, which comprises, (1) phosgenating a bisphenol under interfacial reaction conditions at a pH in the range of about 10 to 12 in the presence of an amount of a phase transfer catalyst which is effective for catalyzing reaction between phosgene and the bisphenol and the calculated amount of phenolic chain-stopper needed for the formation of a polycarbonate having a predetermined molecular weight until about 1 to 70 mole % of phosgene has been added, based on the total moles of available arylhydroxy of the bisphenol and calculated moles of phenolic chain stopper, (2) lowering the pH of the mixture of (1), to a value in the range of about 8.0 to 9.0, and while maintaining such pH range, continuing to phosgenate until up to about a 2 mole % excess of phosgene has been introduced which is at least adequate to generate sufficient chloroformate end groups capable of reacting with both available bisphenol hydroxy groups and the calculated moles of hydroxy in the phenolic chain-stopper of (1), (3) introducing into the resulting mixture, the calculated moles of phenolic chain-stopper sufficient to achieve the desired polycarbonate molecular weight range, (4) raising the pH of the phosgenation mixture to a value in the range of 10 to 12, and (5) eliminating any excess chloroformate groups in the resulting mixture.

Among the preferred phase transfer catalyst which can be utilized in the practice of the present invention there are included, $$(R)_4Q^+X \qquad (1)$$

where R is a member selected from the same or different, $C_{(4-10)}$ alkyl groups, Q is a nitrogen or phosphorus atom, and X is a member selected from halogen atoms, or an $-OR^1$ group, and $R^1$ is a member selected from hydrogen, a $C_{(1-8)}$ alkyl group and a $C_{(6-18)}$ aryl group. Some of the phase transfer catalysts which can be used in the practice of the invention are, $[CH_3(CH_2)_3]_4NX$

[CH₃(CH₂)₃]₄PX

[CH₃(CH₂)₅]₄NX

[CH₃(CH₂)₆]₄NX

[CH₃(CH₂)₄]₄NX where X is selected from Cl⁻, Br⁻ or —OR¹.

An effective amount of a PTC is 0.1% to 10% by weight, and preferably 0.5% to 2% based on the weight of bisphenol in the phosgenation mixture.

Some of the bisphenols which can be phosgenated in accordance with the practice of the present invention are for example,
resorcinol
4-bromoresorcinol
hydroquinone
4,4'-dihydroxybiphenyl
1,6-dihydroxynaphthalene
2,6-dihydroxynaphthalene
bis(4-hydroxypenyl)methane
bis(4-hydroxyphenyl)diphenylmethane
bis(4-hydroxyphenyl)-1-naphthylmethane
1,1-bis(4-hydroxyphenyl)ethane
1,2-bis(4-hydroxyphenyl)ethane
1,1-bis(4-hydroxyphenyl)-1-phenylethane
2,2-bis(4-hydroxyphenyl)propane ("bisphenol A")
2-(4-hydroxyphenyl)-2-)3-hydroxyphenyl)propane
2,2-bis(4-hydroxyphenyl)butane
1,1-bis(4-hydroxyphenyl)isobutane
1,1-bis(4-hydroxyphenyl)cyclohexane
1,1-bis(4-hydroxyphenyl)cyclododecane
trans-2,3-bis(4-hydroxyphenyl)-2-butene
2,2-bis(4-hydroxyphenyl)adamantane
α,α'-bis(4-hydroxyphenyl)toluene
bis(4-hydroxyphenyl)acetonitrile
2,2-bis(3-methyl-4-hydroxyphenyl)propane
2,2-bis(3-ethyl-4-hydroxyphenyl)propane
2,2-bis(3-n-propyl-4-hydroxyphenyl)propane
2,2-bis(3-isopropyl-4-hydroxyphenyl)propane
2,2-bis(3-sec-butyl-4-hydroxyphenyl)propane
2,2-bis(3-t-butyl-4-hydroxyphenyl)propane2,2-Bis (3-cyclohexyl-4-hydroxyphenyl)propane
2,2-bis(3-allyl-4-hydroxyphenyl)propane
2,2-bis(3-methoxy-4-hydroxyphenyl)propane
2,2-bis(4-hydroxyphenyl)hexafluoropropane
1,1-dichloro-2,2-bis(4-hydroxyphenyl)ethylene
1,1-dibromo-2,2-bis(4-hydroxyphenyl)ethylene
1,1-dichloro-2,2-bis(5-phenoxy-4-hydroxyphenyl)ethylene
4,4'-dihydroxybenzophenone
3,3-bis(4-hydroxyphenyl)-2-butanone
1,6-bis(4-hydroxyphenyl)-1,6-hexanedione
ethylene glycol bis(4-hydroxyphenyl)ether
bis(4-hydroxyphenyl)ether
bis(4-hydroxyphenyl)sulfide
bis(4-hydroxyphenyl)sulfoxide
bis(4-hydroxyphenyl)sulfone
9,9-bis(4-hydroxyphenyl)fluorene
2,7-dihydroxypyrene
6,6'-dihydroxy-3,3,3',3'-tetramethylspiro(bis)indane("-spirobiindane bisphenol")
3,3-bis(4-hydroxyphenyl)phthalide
2,6-dihydroxydibenzo-p-dioxin
2,6-dihydroxythianthrene
2,7-dihydroxyphenoxathiin
2,7-dihydroxy-9,10-dimethylphenazine
3,6-dihydroxydibenzofuran
3,6-dihydroxydibenzothiophene
2,7-dihydroxycarbazole In the practice of one form of the present invention, diarylcarbonate-free polycarbonate can be made by initially blending bisphenol with an organic solvent and an effective amount of phase transfer catalyst. Sufficient alkali metal hydroxide can be utilized to raise the pH of the the bisphenol reaction mixture prior to phosgenation, with a value of about 10.5 resulting in the dissolution of some of the bisphenol into the aqueous phase.

Suitable organic solvents which can be used are for example, chlorinated aliphatic hydrocarbons, such as methylene chloride, chloroform, carbon tetrachloride, dichloroethane, trichloroethane, tetrachloroethane, dichloropropane and 1,2-dichloroethylene; substituted aromatic hydrocarbons such as, chlorobenzene, o-dichlorobenzene, the various chlorotoluenes. The chlorinated aliphatic hydrocarbons, especially methylene chloride, are preferred.

Aqueous alkali, or alkaline earth metal hydroxide can be used to maintain the pH of the phosgenation mixture near the pH set point, which may be in the range of between about 10 to about 12. Some of the alkali metal or alkaline earth metal hydroxides, which can be employed are for example, sodium hydroxide, potassium hydroxide, and calcium hydroxide. Sodium and potassium hydroxides, and particularly sodium hydroxide is preferred.

The phenol chain-stopped polycarbonate can be made in a wide variety of either semi-batch or continuous reactors. Such reactors are, for example, stirred tank reactors, which may be either semi-batch or continuous flow. Additional reactors which are included are agitated column and recirculating loop continuous reactors.

The volume ratio of aqueous to organic phase during and at the termination of the phosgenation reaction can be in the range of about 0.2–1:1. Reaction temperatures can be in the range of between about 15°–50° C. When methylene chloride is used, the reaction may be conducted at reflux which can be 35°–42° C. The reaction can be conducted at atmospheric pressures, although sub- or superatmospheric pressures may be employed if desired.

During phosgenation, the mixture is agitated, such as, by using a stirrer or other conventional equipment. The phosgenation rate can vary from between about 0.02–0.2 mol of phosgene, per mol of bisphenol per minute.

End-capping phenols which can be used in the practice of the present invention are monohydroxy aromatic compounds, such as phenol, p-butylphenol, p-cumyl phenol, octylphenol, and nonylphenol.

In order to avoid premature precipitation of alkali metal salt, such as sodium chloride in particular instances, there can be added along with prior to the addition of the phase transfer catalyst, sufficient water if necessary to preclude a build-up in salt concentration exceeding 25% by weight of the aqueous phase.

Recovery of the polycarbonate can be achieved by conventional means, such as decanting the reaction mixture from the solids or by stripping under reduced pressure.

In order that those skilled in the art will be better able to practice the present invention, the following example is given by way of illustration and not by way of limitation. All parts are by weight unless otherwise indicated.

EXAMPLE 1

A 2 L, 5-necked Morton flask equipped with a mechanical stirrer, a pH electrode, a dip tube for addition of NAOH, a dip tube for addition of phosgene, and a cold water condenser was charged with 114.0 g of bisphenol A (BPA) (0.500 mol), 800 mL of $CH_2Cl_2$, 200 mL water, and 2.2 mL of a 40 wt % tetrabutylammonium hydroxide solution (0.0035 mol). A peristaltic pump interfaced with a PH controller was used to add an aqueous NAOH solution (9.94 molar) to the reaction mixture when the pH dropped below a desired set point. At the start of the reaction, phosgene was added at 3.0 g/min while maintaining the pH at 10.8. After 0.70 eq. of the phosgene (35 g) had been added, the pH set point was lowered to 8.2 and phosgene addition was continued until 50.9–51.4 g of phosgene (1–2% excess based on total phenolics) had been added. There was then added 4.246 g of cumyl phenol (0.04 eq based on BPA), and the pH was adjusted to 10.8. This caused the chain-stopper to be incorporated and the remaining hydroxy terminated oligomers to react with available chloroformates that were present at the lower pH. The phosgenation mixture was then evaluated to determine whether any residual chloroformate end groups were present. The level of chloroformate was determined by using 4-(4-nitrobenzyl)pyridine in accordance with the procedure of Agree et al, Talanta, 1966, 13, 1151–1160. These chloroformates were consumed by either agitating the mixture until chloroformates were not detected or by adding sufficient bisphenol A as an aqueous sodium phenoxide solution in an amount equivalent to chloroformate detected in solution.

Polycarbonate was formed having a Mw of 41K. A portion of the isolated polycarbonate was dissolved in $CH_2CL_2$, precipitated with $CH_3CN$, and the supernatant was analyzed by HPLC for the presence of diphenyl carbonate. Analysis in this way revealed non-detectable levels of diphenyl carbonate (less than 50 ppm).

Although the above example is directed to only a few of the very many variables which can be employed in the practice of the method of the present invention, it should be understood that the method of the present invention involves the use of a much broader variety of bisphenols, phase transfer catalysts, and chain-stoppers as set forth in the description preceding this example.

What is claimed is:

1. A method for making polycarbonate having a predetermined molecular weight which is substantially free of diarylcarbonate, which comprises,
    (1) adding phosgene to a bisphenol under interfacial reaction conditions at a pH in the range of about 10 to 12 in the presence of an amount of a phase transfer catalyst which is effective for catalyzing reaction between phosgene and the bisphenol until about 1 to 70 mole % of phosgene has been added, based on the total moles of available arylhydroxy of the bisphenol,
    (2) lowering the pH of the mixture of (1), to a value in the range of about 8.0 to 9.0, and while maintaining such pH range, continuing to add phosgene to the mixture until up to about a 2 mole % excess of phosgene has been introduced which is at least adequate to generate sufficient chloroformate end groups capable of reacting with available bisphenol hydroxy groups and the calculated moles of hydroxy in phenolic chain-stopper hydroxy groups sufficient to provide polycarbonate having the predetermined molecular weight,
    (3) introducing into the resulting mixture, the calculated moles of phenolic chain-stopper sufficient to achieve the desired predetermined polycarbonate molecular weight range,
    (4) raising the pH of the resulting mixture to a value in the range of 10 to 12, and
    (5) eliminating any excess chloroformate groups in the resulting mixture.

2. A method in accordance with claim 1, where the bisphenol is bisphenol A.

3. A method in accordance with claim 1, where the phase transfer catalyst is tetrabutylammonium hydroxide, tetrabutylammonium bromide or tetrabutylammonium chloride.

4. A method in accordance with claim 1, wherein the chain-stopping phenol is cumyl phenol.

5. A method in accordance with claim 1, where in step 5, excess chloroformate groups are eliminated by agitating the reaction mixture.

6. A method in accordance with claim 1, where in step 5, phenol is added to effect the removal of chloroformate.

* * * * *